(12) United States Patent
Larsson et al.

(10) Patent No.: US 10,661,379 B1
(45) Date of Patent: May 26, 2020

(54) FRICTION STIR WELDING FLASH REMOVAL COMPONENT

(71) Applicant: ESAB AB, Göteborg (SE)

(72) Inventors: Håkan Larsson, Laxå (SE); Jörgen Säll, Laxå (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 16/229,536

(22) Filed: Dec. 21, 2018

(51) Int. Cl.
*B23K 20/00* (2006.01)
*B23K 20/12* (2006.01)
*B23K 37/08* (2006.01)

(52) U.S. Cl.
CPC .......... *B23K 20/1255* (2013.01); *B23K 37/08* (2013.01)

(58) Field of Classification Search
CPC .. B23K 20/1255; B23K 20/125; B23K 37/08; B23K 20/12
See application file for complete search history.

(56) References Cited

U.S. PATENT DOCUMENTS

| | | | |
|---|---|---|---|
| 5,794,835 A | 8/1998 | Colligan et al. | |
| 6,648,206 B2 | 11/2003 | Nelson et al. | |
| 6,779,704 B2 | 8/2004 | Nelson et al. | |
| 6,926,970 B2 | 8/2005 | James et al. | |
| 7,124,929 B2 | 10/2006 | Nelson et al. | |
| 7,152,776 B2 | 12/2006 | Nelson et al. | |
| 7,661,572 B2 | 2/2010 | Nelson et al. | |
| 7,993,575 B2 | 8/2011 | Nelson et al. | |
| 8,302,834 B2 | 11/2012 | Nelson et al. | |
| 8,551,357 B2 | 10/2013 | Miyazaki et al. | |
| 8,910,851 B2 | 12/2014 | Rosal et al. | |
| 9,061,370 B2 | 6/2015 | Nelson et al. | |
| 9,120,188 B2 | 9/2015 | Hotte | |
| 9,352,425 B2 | 5/2016 | Rosal et al. | |
| 9,931,710 B2 | 4/2018 | Becker et al. | |
| 10,112,252 B2 | 10/2018 | Romenesko et al. | |
| 2001/0004989 A1 | 6/2001 | Ezumi et al. | |
| 2003/0098335 A1 | 5/2003 | Saeki et al. | |
| 2009/0236045 A1* | 9/2009 | Burton | B23K 20/1255 156/349 |

FOREIGN PATENT DOCUMENTS

DE 19745123 C1 6/1999

* cited by examiner

*Primary Examiner* — Erin B Saad
(74) *Attorney, Agent, or Firm* — Edell, Shapiro & Finnan, LLC

(57) ABSTRACT

The flash removal unit presented herein is suitable for a friction stir welding (FSW) head and includes a blade and an annular body. The blade removes flash created by a FSW tool during FSW operations. The an annular body defines a flash capture area around the blade and is configured to at least temporarily retain the flash removed by the blade within the flash capture area. The flash removal unit may also define a flow path along which the flash can be suctioned away from the flash removal unit.

19 Claims, 11 Drawing Sheets

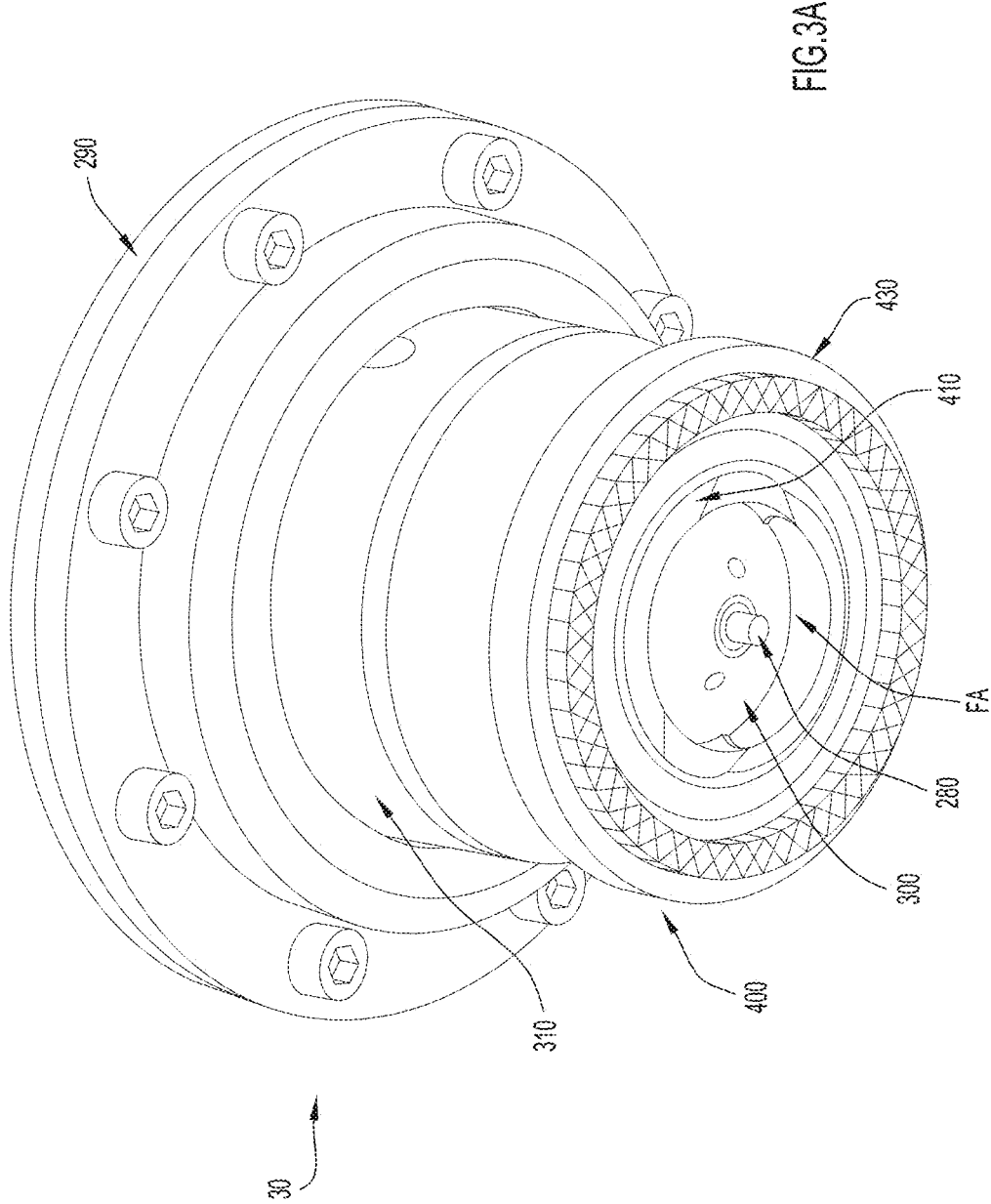

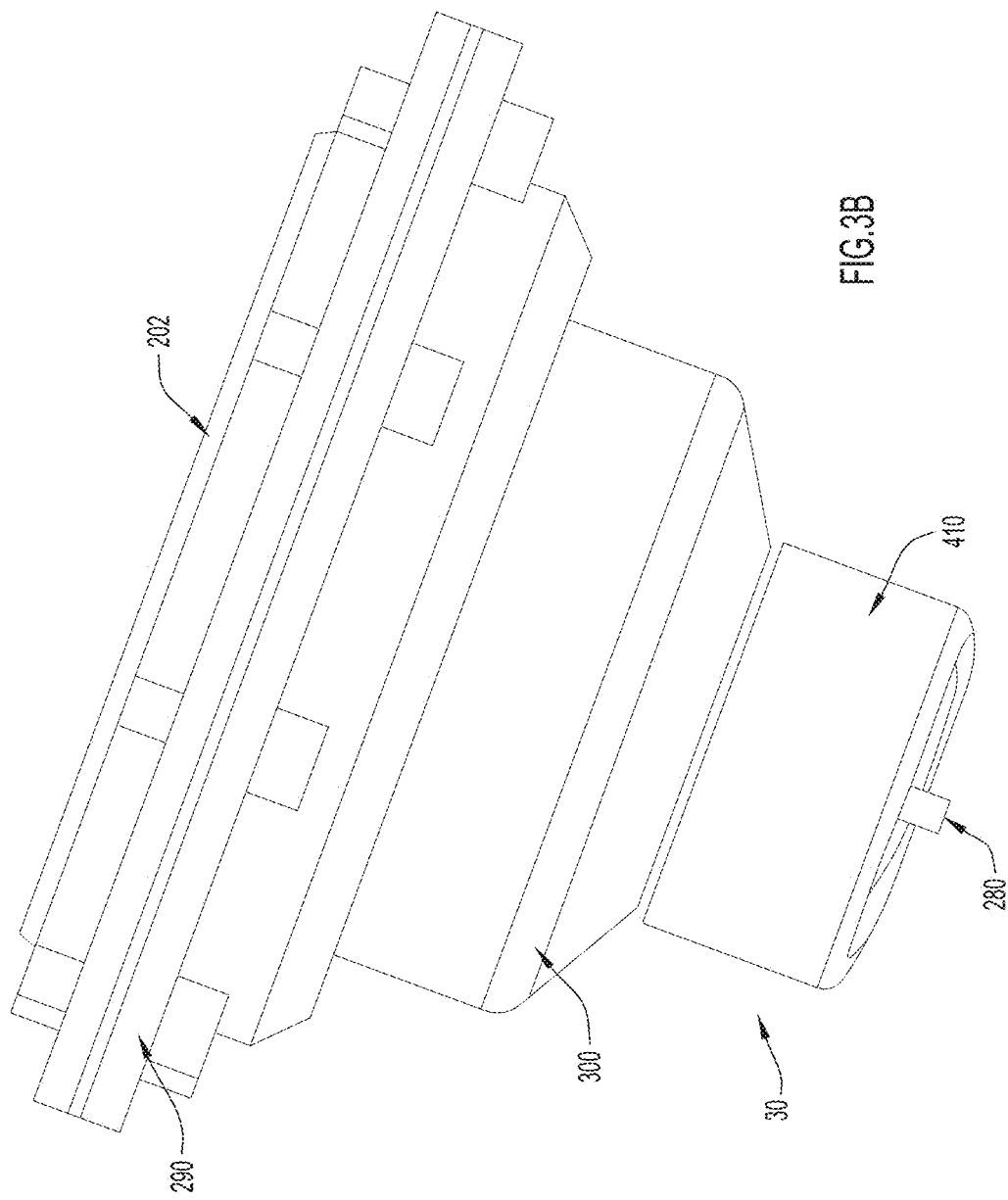

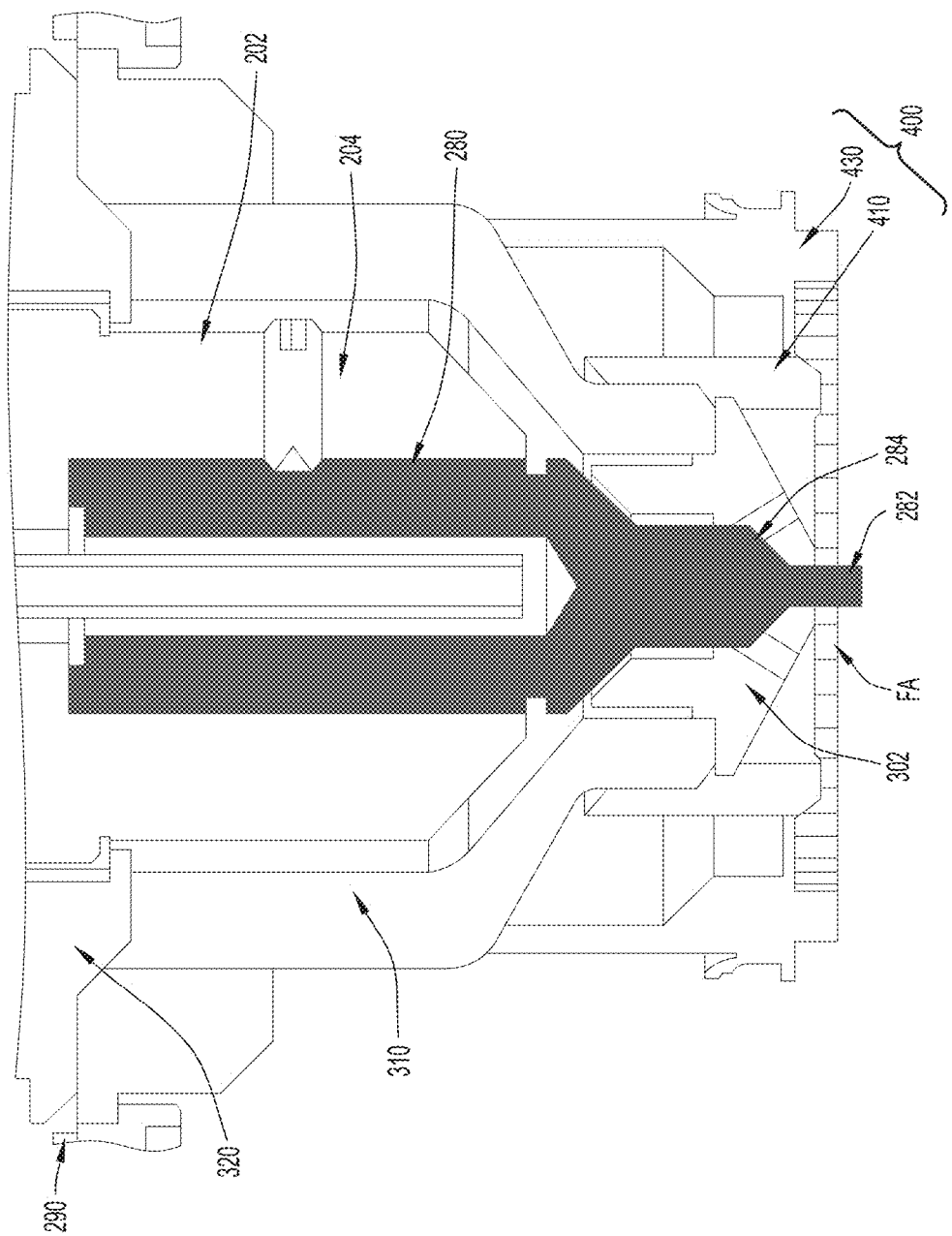

FRICTION STIR WELDING FLASH REMOVAL COMPONENT

TECHNICAL FIELD

The present disclosure is directed towards a component for a friction stir welding (FSW) head that facilitates flash removal.

BACKGROUND

Friction stir welding (FSW) is a welding process that uses heat generated from high-pressure friction to form a joint between two workpieces and/or to fix cracks in a workpiece. That is, during FSW operations, an FSW tool traverses a joint or seam disposed between the workpieces (or a crack in a workpiece) and the one or more workpieces are plasticized by frictional heat generated by rotation of the FSW tool. As the FSW tool traverses the seam, the FSW tool is also pressed against the one or more workpieces. More specifically, during a welding operation, a shoulder is pressed against the workpiece(s) and a pin rotates in the seam between the workpieces (or in a crack in a workpiece). In some FSW heads, the shoulder rotates with or relative to the pin, but in other FSW heads, the shoulder may be stationary. Rotation of the pin (and the shoulder in some instances), softens and mixes the materials forming the workpieces. Then, the mixed materials consolidate to form a solid-state weld.

An FSW tool (which may include the pin and the shoulder) can traverse a seam (or crack) when its FSW head moves relative to the workpiece(s) and/or when the workpiece(s) are moved relative to the welding tool (e.g., the welding tool may be stationary). Regardless, as a FSW tool welds a seam, the friction between the FSW tool and the workpiece(s), the softening of the workpieces(s) causes at least some material to be extruded away from the workpieces as "flash." For example, often, a circumferential collar of extruded material rolls back from the FSW tool to form a configuration resembling a ram's horn, which is commonly referred to as a bifurcated flash formation. Consequently, to finish a FSW weld, the flash must be removed from the workpiece(s).

Often, the flash is removed with milling or grinding processes that traverse the seam after the FSW tool. For example, after welding a seam, a FSW tool can be removed from a rotary machine and replaced with a milling tool so that the rotary machine can remove the flash during a second pass over the weld. Alternatively, a user can mill the flash with a milling tool that is separate and distinct from the FSW machine. However, each of these options lengthens the takt time (e.g., the rate of production) for a particular job. Still further, some FSW welding heads have incorporated blades that can remove (e.g., cut) flash from a weld seam as the FSW welding head traverses the seam; however, often these blades scatter chips (i.e., pieces of flash) throughout the workplace. Not only does this scattering of chips create a mess, but also in some instances, the chips may enter the FSW machine and force an end-user to clean the machine. Alternatively, the chips might adhere to a part of the weld seam that has yet to full coalesce, negating the blade's attempt to remove the flash from the seam.

SUMMARY

The present disclosure is directed towards a friction stir welding (FSW) flash removal unit and FSW heads including the same. According to one embodiment, the FSW flash removal unit includes a blade and an annular body. The blade removes flash created by a FSW tool during FSW operations. The annular body defines a flash capture area around the blade and is configured to at least temporarily retain the flash removed by the blade within the flash capture area. Advantageously, since the annular body retains the flash in the flash capture area, removed flash is not scattered across workpiece, workshop, and/or back into a weld seam from which it was removed.

In at least some of these embodiments, the annular body is an annular brushing unit and the flash removal unit includes an annular cutting unit that includes the blade. In these embodiments, the annular brushing unit is disposed radially exterior of the annular cutting unit. In at least some of these embodiments, the blade extends along at least a portion of an inner edge of the annular cutting unit so that the blade is at least partially annular. For example, the portion of the inner edge may be a portion aligned with a trailing edge of the FSW operations. This may ensure that the blade extends across or spans a plasticized region created during FSW operations and, thus, may ensure that the blade removes flash generated at any location of the plasticized region. In some embodiments, the blade is stationary with respect to the FSW head and is positioned to shave a top of a plasticized region created during the FSW operations. Advantageously, a stationary blade will not scatter flash as it detaches the flash from a welding seam (i.e., a plasticized region), especially as compared to blades that rotate with an FSW tool.

In some embodiments of the FSW flash removal unit, the flash removal unit includes a brush that is longitudinally aligned with the blade and configured to at least temporarily retain the flash removed by the blade within the flash capture area. The brush may be compressible against a workpiece and, thus, may act to form a seal or seal-type enclosure with the workpiece that encloses the flash capture area. However, the brush may also be air permeable so that the flash removal unit can be operatively coupled to a vacuum unit that can remove detached flash from the flash removal unit with suction. In fact, in some embodiments, the flash removal unit includes a flow path that extends through the annular body and guides the flash removed by the blade away from the flash capture area. In some instances, a vacuum unit may be attached to the flow path to provide the aforementioned suction. In at least some embodiments, the blade is included in a cutting unit that defines one or more first openings and the annular body defines one or more second openings. The one or more first openings and the one or more second openings define the flow path.

According to another embodiment, a cutting unit suitable for a FSW head is presented herein. The cutting unit includes an annular body and a partially annular blade. The annular body has a top and a bottom. The bottom has an inner edge and an outer edge. The partially annular blade extends around at least a portion of the inner edge of the bottom of the annular body and the annular body is fixed to the FSW head so that the partially annular blade is stationary with respect to the FSW head during FSW operations of the FSW head. Additionally, the annular body is fixed to the FSW head so that the blade is positioned to trail a FSW tool included in the FSW head and cut flash created by the FSW tool during FSW operations off of a weld seam. As mentioned, a stationary blade offers advantages over rotating blades at least because it does not create a mess of scattered chips that need to be cleaned from the workshop, the machine, and potentially the weld seam.

In at least some of these embodiments, the annular body includes one or more openings configured to guide the flash cut off of the weld seam away from the weld seam. Due to these openings, the cutting unit may direct removed flash to a specific location so that, for example, the flash may be collected by a vacuum unit. Consequently, the openings may further ease cleanup after FSW operations. Additionally or alternatively, the partially annular blade may extends around the entire inner edge. If the blade extends around the entire inner edge, a FSW machine may continue FSW operations in any direction without rearranging or reorienting the cutting unit. The cutting unit will cut flash no matter the direction of the FSW operations.

According to yet another embodiment, a FSW head is provided herein. The FSW head includes a head housing, an axle, and an annular flash removal unit. The head housing extends from a top end to a bottom end. The axle is coaxial with and rotatable within the head housing. The axle also includes an end portion that extends beyond the head housing and supports an FSW tool. The annular flash removal unit removes flash created by the FSW tool during FSW operations of the FSW head. Additionally, the annular flash removal unit defines a flash capture area around the FSW tool and at least temporarily retains removed flash within the flash capture area. Thus, the FSW head advantageously removes flash during FSW operations while preventing or reducing the amount of flash scattered across workpiece, workshop, and/or weld seam. Moreover, and also advantageously, the FSW head may be a stationary shoulder FSW head or a rotating shoulder FSW head.

BRIEF DESCRIPTION OF THE DRAWINGS

FIG. 3A is a bottom perspective view of a flash removal unit installed on an engagement end of the FSW head of FIG. 1B, the flash removal unit being formed in accordance with an example embodiment of the present disclosure.

FIG. 3B is a front perspective view of the flash removal unit of FIG. 3A, but with a brush unit included in the flash removal unit removed.

FIG. 4 is a front sectional view of a portion of the flash removal unit of FIG. 3A installed on the engagement end of the FSW head of FIG. 1B.

Like numerals identify like components throughout the figures.

DETAILED DESCRIPTION

A friction stir welding (FSW) component that can be included in or coupled to a FSW head and facilitates flash removal is presented herein. Generally, the FSW component is a flash removal unit and includes a cutting unit and a brush unit. The cutting unit includes a blade that is configured to remove or detach flash from a welding seam and/or workpiece and the brushing unit is configured to retain the detached flash within a boundary defined by a perimeter of the flash removal unit. That is, the cutting unit and the brushing unit are each annular components and are configured to remove and retain flash within a central opening defined by their annuli. Moreover, the cutting unit and the brushing unit collectively define a passageway that can be operatively coupled to a vacuum unit so that any detached flash removed and retained by the flash removal unit can be neatly removed from the FSW head and the workpiece with suction.

Thus, advantageously, the flash removal unit presented herein removes flash without creating a mess of chips scattered over/in the workpiece, the FSW seam, and/or the FSW machine. By comparison, a single blade that rotates around a FSW head to remove flash may scatter chips of flash (also referred to herein simply as chips, detached flash, removed flash, or variations thereof) around a workspace, along a workpiece, and into a machine. This scattering of chips may negate any efficiencies allegedly created by the blade (e.g., efficiencies associated with removing flash while welding) since a user will be required to perform extensive cleanup of the FSW machine, the workpiece, and/or the workspace after completing FSW operations with a rotating blade. Alternatively, if an end user eschews does not use a rotating blade, the end user will be required to perform additional machining after completing FSW operations to finish the FSW seam. For example, the end user may need to grind or mill the FSW seam to remove flash. Not only is the additional machining timely and inefficient, but it may also be more difficult to remove flash after a FSW seam has cooled and hardened, which may cause a user to exert more force on, and possibly damage, the seam during the additional machining.

Figure 1A:
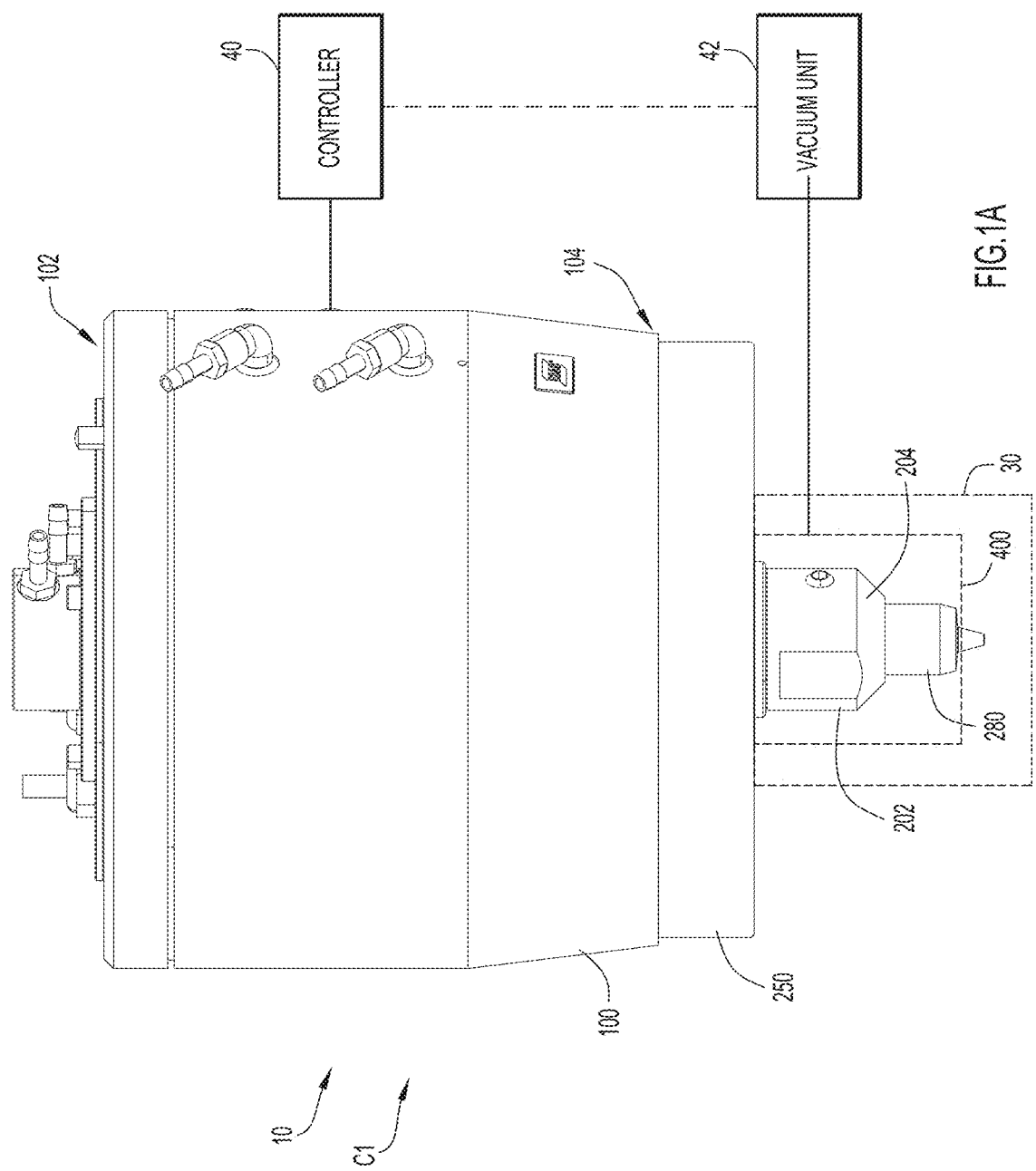
FIG. 1A is a side view of a friction stir welding (FSW) head with a representation of a flash removal unit according to an example embodiment of the present disclosure, the FSW head being disposed in a first configuration.
Figure 1B:
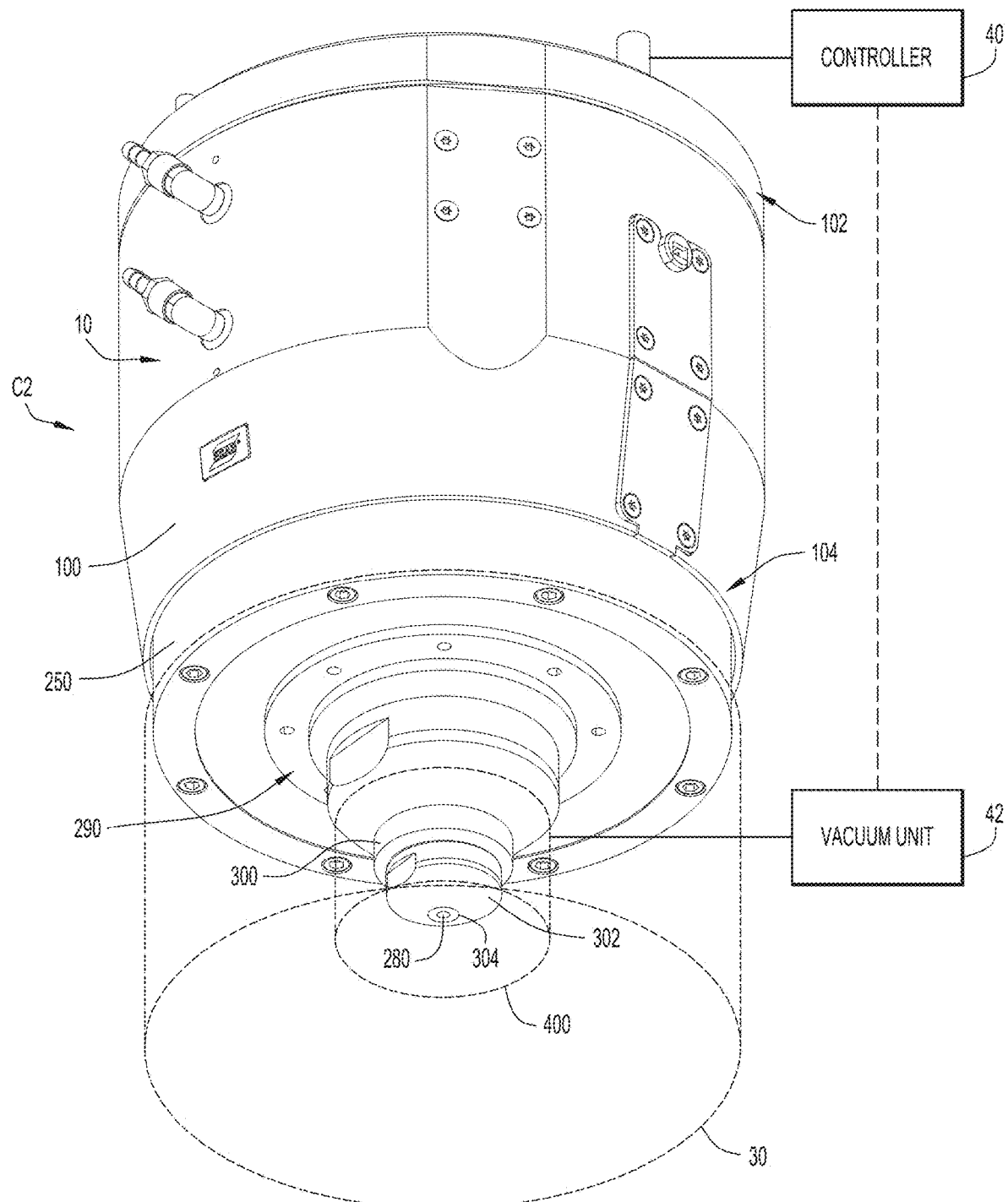
FIG. 1B is a bottom perspective view of the FSW head of FIG. 1A while disposed in a second configuration and including a representation of a flash removal unit formed in accordance with another example embodiment of the present disclosure included thereon.

FIGS. 1A and 1B illustrate an example FSW head 10 that can accommodate the flash removal unit 400 presented herein while in a rotating shoulder configuration C1 (see FIG. 1A) or a stationary shoulder configuration C2 (see FIG. 1B). In order to clearly show the FSW head 10, FIGS. 1A and 1B illustrate the FSW head 10 with a representation of a flash removal unit 400 installed thereon and the flash removal unit is shown in further detail in the subsequent figures. Notably, the welding head 100 can be transitioned between the rotating shoulder configuration C1 and the stationary shoulder configuration C2 by adding or removing a bell housing 300 to a bottom of the FSW welding head 100. Otherwise, the FSW head 10 is largely the same in both configuration C1 and configuration C2.

Although the FSW head 10 shown in FIGS. 1A in 1B is shown primarily to illustrate an example FSW head that can support the flash removal unit 400 (also referred to as a flash removal accessory 400 or flash removal component 400) presented herein, the FSW head 10 is now described in at least some detail in order to provide a full understanding of the flash removal component 400. However, the description of FSW head 10 is in no way intended to limit the scope of the flash removal component 400 presented herein and it is to be understood that the flash removal component 400 can be installed on any FSW head now known or developed hereafter. Moreover, the description included below of FSW head 10 is relatively brief and focused on operations of FSW head 10 that are relevant to the flash removal component 400 at least because the FSW head 10 depicted in the Figures is described in detail (without the flash removal accessory 400) in U.S. patent application Ser. No. 15/941,092, filed on Mar. 30, 2018, and entitled "Welding Head for Friction Stir Welding," which is hereby incorporated by reference in its entirety.

That all being said, the FSW head 10 illustrated in FIGS. 1A and 1B includes a head housing 100 and an axle 202. The head housing 100 extends from a first or top end 102 to a second or bottom end 104. The top end 102 can be attached to a robot, gantry, or other such holding structure. Meanwhile, the bottom end 104 provides an opening that can receive an axle 202. The axle 202 is coaxial with a central axis of the housing 100 and extends through a bore defined by the housing 100 in an axial or longitudinal direction so that a portion 204 of the axle 202 extends beneath the bottom end 104 of the housing 100. An FSW tool 280 that defines a shoulder and pin/probe during FSW is coupled to portion 204 of the axle 202 (which may also be referred to as bottom end 204, welding end 204, or engagement end 204).

In this application, portion 204 of axle 202, the tool 280 installed therein, and the bell housing 300 may be collectively referred to as the engagement or welding portion 30 of the FSW head 10. The welding portion 30 is described in further detail below; however, generally, the flash removal accessory 400 presented herein is installed or included on/over the welding portion 30 of the FSW head 10. For example, when the FSW head 10 is in the rotating shoulder configuration C1, the flash removal unit 400 is installed onto and over the FSW tool 280 and the portion 204 of axle 202 that protrudes below the bottom end 104 of housing (as illustrated at a high-level in FIG. 1A). Meanwhile, when the FSW head 10 is in the stationary shoulder configuration C2, the flash removal unit 400 is installed or included onto/over the FSW tool 280, the portion 204 of axle 202 that protrudes below the bottom end 104, and the bell housing 300 (as is illustrated at a high-level in FIGS. 1B and 2). In at least some embodiments, the FSW head 10 may include a mount 290 (see FIGS. 1B and 3A) that helps to align the welding portion 30 with a central, longitudinal axis of the head housing 100.

Before or subsequent to installing the flash removal unit 400 on the FSW head 10, the flash removal unit 400 can be connected to a vacuum unit 42 that can provide suction for the flash removal unit 400. The vacuum unit may also include or define a bag, canister, dust bag, cyclone, and/or any such receptacle that can capture chips of detached flash that are suctioned out of the flash removal unit 400 (similar to a household vacuum). Alternatively, the flash removal unit might include an on-board vacuum unit that can provide suction and capture chips of detached flash. As is described in further detail below, suction, whether from an external vacuum unit, like vacuum unit 42, or an on-board vacuum unit, allows the flash removal unit 400 to capture and remove flash that it detaches from a weld seam the FSW head 10 creates. In some embodiments, the vacuum unit 42 may be controlled by a controller 40 that is controlling operations of the FSW head (as is described below) so that, for example, the vacuum unit 42 is powered on when the FSW head 10 is powered on.

Figure 2:
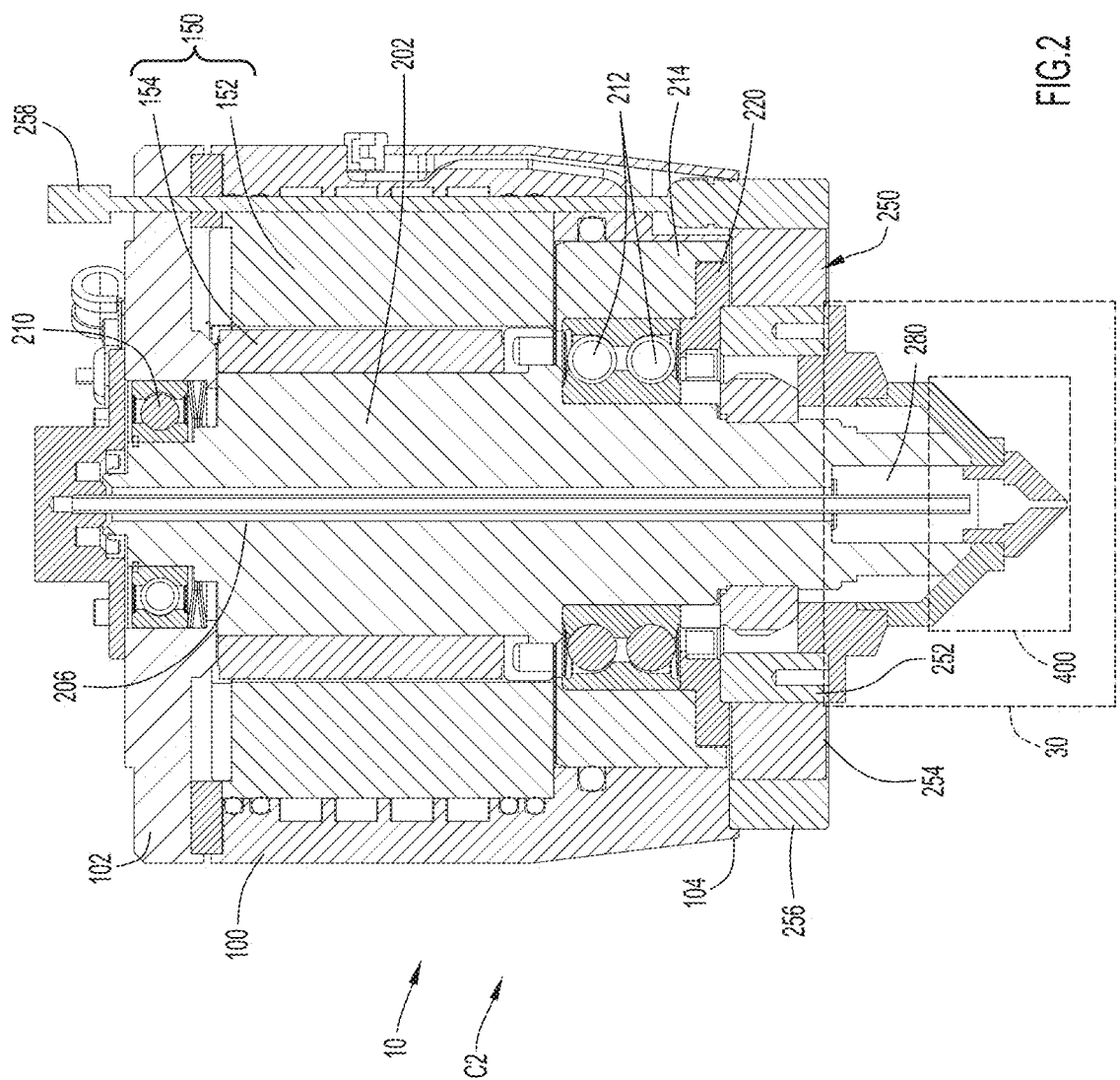
FIG. 2 is a sectional view of the FSW head of FIG. 1B.

Still referring to FIGS. 1A and 1B, but now with reference to FIG. 2 as well, in the depicted embodiments, an annular load cell 250 is also positioned beneath the bottom end 104, so that the load cell 250 is adjacent or proximate the engagement end 204 of the axle (and the tool 280). Generally, the load cell 250 generates load signals as a function of forces exerted on the engagement end 204 of the axle 202 (by way of the tool 280). In other words, and as is explained in further detail in U.S. patent application Ser. No. 15/941,092, which, as mentioned above, is incorporated by reference in its entirety, as the tool 280 acts against a workpiece, the axle 202 will move slightly upwards with respect to the housing 100, pushing or pulling a portion of the load cell 250 so that the load cell 250 generates load signals as a function of the longitudinal forces exerted on the bottom end 204 of the axle 202 (by way of the tool 280).

To effectuate this, the FSW head 100 may include a connector ring 220 that couples an inner ring 252 of the load cell 250 to the axle 202 (e.g., via other components included in FSW head 100). On the other hand, the inner ring 252 is also flexibly coupled, via a flexible portion 254, to the outer ring 256 of the load cell, which is fixedly coupled to the head housing 100. Thus, any axial movement of the axle may cause the load cell 250 to generate load signals due to the relative movement of the inner ring 252 with respect to the outer ring 256. The signals may be sent to controller 40 via signal path 258 so that the controller 40 can control operations of the FSW head 10.

For example, upon receiving load signals, the controller 40 may convert the load signals into force measurements (e.g., digital data) that can be used to control the FSW operations and ensure a high-quality weld. That is, the controller may accumulate data from the load signals and determine whether the downward force applied to the FSW head needs to be altered, for example, to ensure complete penetration with the FSW tool 280. Force measurements can be taken continuously and are used to maintain the force at a desired level throughout the welding process to produce a smooth surface and desired characteristics of the weld. Depending on the requirements of a particular welding process or workpiece, the target force level can be programmed to vary during sections of a weld. Further, the force measured throughout a welding process can be recorded (e.g., the force can be recorded on a time basis or as a function of the position of the welding head relative to the workpiece). Optionally, controller 40 can be configured to generate a visual or aural warning in the event the force deviates from a target force level.

Still referring to FIGS. 1A, 1B, and 2, overall, the depicted welding head 10 is compact and does not require external forces (e.g., from a spindle drive/actuator, etc.). That is, the welding head 10 has relatively small external dimensions and may be a relatively self-contained FSW head, insofar as the head may operate without an external drive mechanism (but may still need to be coupled to a power source, controller, and/or a holding device, such as a gantry). As an example of the external dimensions of the welding head 10, the welding head 100 may have an external diameter in the range of approximately 100 mm to approximately 500 mm and an external longitudinal dimension (e.g., a height) in the range of approximately 200 mm to approximately 1,000 mm. As one specific example, for a typical welding thickness up to 12 mm, the welding head 100 may have an external diameter of approximately 250 mm and an external longitudinal dimension (e.g., a height) of approximately 325 mm.

This compact design reduces deviation (bend) created on a holding structure (robot, gantry, etc.) and also minimizes the chances of the head 10 colliding with portions of the workpiece, portions of a holding structure, or other such objects during FSW operations. Consequently, the FSW head depicted in FIGS. 1A and 1B may be suitable, if not preferable, for supporting the flash removal unit 400 supported herein. That is, the FSW head 10 depicted in FIGS. 1A and 1B may reduce or eliminate deflection issues that have sometimes caused annular cutting blades to be problematic. However, in other embodiments, the flash removal unit presented herein can also be used with, incorporated into, or included in FSW welding heads of any shape or size that operate in any manner now known or developed hereafter to effectuate FSW operations.

Now turning to FIG. 2, although the flash removal accessory provided herein can be used with a myriad of FSW heads, for completeness, FIG. 2 depicts a sectional view the welding head 10 shown in FIG. 1B. The sectional view depicts the axle 202 in its entirety, a motor 150 that is configured to rotate the axle 202 about a central axis and various bearings that facilitate this rotation. More specifically, the axle 202 is a rotatable body that extends from (or through) the top end 102 of the housing 100 to (or through/out of) the bottom end 104 of the housing 100. The axle 202 may be substantially cylindrical; however, the axle may also include various steps, depressions, receptacles, and other such features that allow the axle to be secured within the head housing 100 in manner that prevents the axle 202 from tilting or translating laterally while also ensuring that the motor 150 can engage and rotate the axle 150.

In the depicted embodiment, the motor 150 is a rotational motor 150 with a stator 152 that is fixedly coupled to the head housing 100 and a rotor 154 that is fixedly coupled to a portion of the axle 202 disposed between an upper bearing 210 and a lower bearing 212 (which is supported by a bearing housing 214). The rotor 154 may be mechanically spaced from the lower bearing 212 and the load cell 250 by a radial spacer to ensure that the rotor 154 does not become magnetically stuck and/or damaged when the lower bearing 212 is serviced. Meanwhile, the stator 152 is fixed to the head housing 100 and can be liquid cooled via inlets/outlets formed in the housing 100. Generally, the motor 150 may impart rotational motion to the axle 202 (and, thus, to the tool 280).

The axle 202 may include an internal bore or passage 206. The passage 206 is configured to align with cooling features included in the tool 280 and with coolant delivery features included in the head housing 100. Additionally, a lower end of the axle 202 may include an axial cavity sized to receive a body of the tool 280. The cavity may have any desirable size and may also include a locking feature (not shown), such as a threaded screw, that allows any desirable tool 280 to be secured to the axle 202. The tool 280 protrudes (e.g., extends downwards) from the lower end 204 of axle 202 and defines a shoulder 284 and a pin or probe 282 (see FIG. 4) that will create a joint in or between one or more workpieces. In the depicted embodiment, the shoulder 284 has a truncated conical shape; however, in other embodiments, the operating end of the tool 280 may have any desirable shape and/or include any desirable features (e.g., the pin may include threads). Moreover, in other embodiments, the pin 282 may be movable with respect to the shoulder 284 (e.g., retractable) and/or include any other FSW features now known or developed hereafter.

Now turning to FIGS. 3A, 3B, and 4, these Figures depict the flash removal unit 400 that is shown as a dashed box representation in FIGS. 1A, 1B, and 2. At a high-level, the flash removal unit includes a cutting unit 410 and a brushing unit 430. The cutting unit 410 is disposed radially interiorly of the brushing unit 430 and, thus, in FIG. 3A, the cutting unit 410 is largely obscured. In FIG. 3B, the brushing unit 430 is removed to show the exterior of the cutting unit 410. In the depicted embodiment, the cutting unit 410 has a cylindrical exterior that engages and extends around a bottom 302 of the bell housing 300. Meanwhile, the brushing unit has a cylindrical exterior that engages and extends around an outer diameter of a midsection 310 of the bell housing 300.

However, in other embodiments, the cutting unit 410 and the brushing unit 430 may have any exterior shape and size. For example, in some embodiments, the flash removal unit 400 may be sized and shaped to match the shape of a stationary shoulder 300, a rotating shoulder 284, and/or a welding surface. As a specific example, in some embodiments, the flash removal unit may be substantially triangular so that the flash removal unit can be used for corners and/or fillet welds.

Additionally, the cutting unit 410 and the brushing unit 430 can be coupled to the FSW head 10 in any manner, provided that the coupling prevents translation of the flash removal unit 400 in at least the X-direction and the Y-direction with respect to the FSW head 10 (e.g., along the bottom face of the welding head 10). In the depicted embodiment, the cutting unit 410 and the brushing unit 430 are coupled to the bell housing 300 (e.g., with fasteners) and, thus are stationary during FSW operations. That is, when the axle 202 is rotated by the motor 150, the bell housing 300 and the flash removal unit 400 will not rotate. Put still another way, the depicted flash removal unit 400 is fixed in all six degrees of freedom with respect to the FSW head 10 (and, thus, moves with the head 10 if, for example, a gantry or arm moves or rotates the FSW head 10).

However, in other embodiments, the flash removal unit 400 may be height adjustable with respect to the FSW head and, thus, may only be fixed in five degrees of freedom with respect to the FSW head 10 (X translation, Y translation, and all three degrees of rotation). That is, in some embodiments, the flash removal unit 400 may be adjustable along a Z-axis (i.e., a longitudinal axis) of the FSW head 10. Additionally or alternatively, in at least some embodiments, the cutting unit 410 and/or the brushing unit 430 may be coupled to another portion of the FSW head 10 (e.g., the head housing 100 or a top portion 320 of the bell housing 300) that fixes the cutting unit 410 and/or the brushing unit 430 with respect to the axle 202.

In other embodiments, the cutting unit 410 and/or the brushing unit 430 can be directly or indirectly coupled to the axle 202 so that at least a portion of the flash removal unit 400 rotates with or with respect to the axle 204. For example, when the flash removal unit is included with or installed onto the FSW head 10 in its rotating shoulder configuration C1 (see FIG. 1A), the cutting unit 410 may be coupled to the axle 202 and the brushing unit 430 may be coupled to the lower end 102 of the housing 100. As other examples, both the cutting unit 410 and the brushing unit 430 may be coupled to the axle 202 (and rotate therewith) or both the cutting unit 410 and the brushing unit 430 may be coupled to the lower end 102 of the housing 100 (to remain stationary as the axle 202 rotates).

Still further, in some embodiments, the flash removal unit 400, or at least a portion thereof, may be coupled to the axle 202 via a gear assembly or other such mechanical components so that the flash removal unit 400 (or a portion thereof)

rotates when the axle 202 rotates, but at a different speed and/or in a different direction. More generally, the flash removal unit 400 can be coupled to any type of FSW head, including bobbin-type FSW heads, stationary shoulder FSW heads, and rotating shoulder FSW heads, in any manner. In fact, the flash removal unit 400 may be particular useful for rotating shoulder FSW heads since a rotating shoulder typically leaves rotation tracks in the weld seam and the flash removal unit 400 can clean those tracks.

Regardless of its exterior shape and size, as well as the manner in which it is coupled to the FSW head 10, the brushing unit 430 of the flash removal unit 400 is annular so that the brushing unit defines a bounded or enclosed flash capture area "FA." That is, since the brushing unit 430 is annular, a periphery of the flash capture area FA is bounded by or enclosed by the brushing unit 430. In at least some embodiments, the cutting unit 410 is also annular; however, the cutting unit 410 need not be annular. Instead, the cutting unit 410 is either disposed within the flash capture area FA so that flash removed from a welding seam by the cutting unit 410 is removed in the flash capture area FA or otherwise configured to introduce detached flash chips into the flash capture area FA. For example, the cutting unit might be a stationary blade that extends across a diameter of the flash capture area FA in a direction that is perpendicular to welding direction of a FSW machine including the flash removal unit 400.

In the depicted embodiment, the cutting unit 410 and the brushing unit 430 are both annular and are also both coaxial with the axle 202 of the welding head 10. Consequently, the flash capture area FA is concentric with the cutting unit 410. Thus, when the flash removal unit 400 removes flash from a welding seam (as is described in detail below in connection with FIG. 8), the removed/detached flash is encouraged to remain beneath the FSW head 10 and is substantially prevented from scattering across a workpiece, workstation, etc.

Now turning to FIGS. 4 and 5A-5E, in the depicted embodiment, the cutting unit 410 includes an annular main body 411 that extends from a bottom 412 to a top 416 (See FIG. 5A) while defining a central opening 418. As can be seen best in FIG. 5C, the bottom 412 has a face 4121 that is defined by an inner edge 4122 and an outer edge 4123. The outer edge 4123 is a rounded or chamfered edge. Meanwhile, the inner edge 4122 is a defined corner (i.e., a right angle or smaller) and at least a portion of the inner edge 4122 receives or defines a blade 414. Moreover, in the depicted embodiment, the bottom face 4121 has a first zone 4125 and a second zone 4126 that are connected by connectors 4127 (shown best in FIGS. 5B and 5C). The connectors 4127 may extend gradually away from the first zone 4125, but may form a hard or defined edge with the second zone 4126.

In the depicted embodiment, the second zone 4126 of the bottom 412 is aligned with an opening 420 formed in the main body 411 and the blade 414 is included along at least a portion of the inner edge 4122 of the second zone 4126. Additionally or alternatively, the blade may be formed along the hard edges formed between the second zone 4126 and the connectors 4127. Either way, the blade 414 is arranged so that it can cut any flash away from a workpiece shortly after the flash is created by the tool 280 welding the workpiece. That is, since the blade 414 extends around at least a portion of the inner an inner edge 4122 of the second zone 4126, the blade 414 will extend across a plasticized region created by the tool 280 and remove any flash created at any point in the plasticized region. Extending the blade 414 along the hard edges formed between the second zone 4126 only expands the width or span of the blade 414 and further ensures that the blade 414 spans the plasticized region (i.e., spans a weld seam).

In some embodiments, the blade 414 may be at least partially formed or defined by the main body 411 and, thus, may be the same material as the main body 411, provided the main body 411 is formed from a material suitable for cutting flash away from a weld seam (e.g., the material has suitable hardness, durability, etc.). Additionally or alternatively, the blade 414 may include a secondary element that is added to or included in the main body 411, such as a hardened steel coating, a knife element, a saw-tooth member, a diamond edge, etc. A secondary element may be included in or attached to the inner edge 4122 of the cutting unit 410 in any manner.

Regardless of how the blade 414 is formed or defined, the blade 414 may be at least partially annular, insofar as "partially annular" is intended to denote that the blade 414 is arcuate and extends along at least a portion of a circular or ovular edge that defines the central opening 418 of the cutting unit 410. In at least some embodiments, the partially annular blade 414 spans the width or diameter of the cutting unit 410. These dimensions ensure that the annular blade 414 spans an entire plasticized region created by the FSW tool 280 and, thus, allow the annular blade 414 to remain stationary, if desired, during FSW operations. Since a stationary blade 414 will only be moving as fast as the welding head 10 is moving laterally along a welding seam, the stationary blade 414 advantageously minimizes the velocity of the blade 414 as it cuts, especially as compared to blades that rotate with an axle and, thus, minimizes the chances of flash being scattered over a workpiece, work station, etc.

That all being said, in other embodiments, the blade 414 may be included along or extend between any surfaces of the bottom 412, provided that the blade 414 can remove flash created during FSW operations as the FSW head 10 completes the FSW operations. That is, the blade 414 may be included along or extend between any surfaces of the bottom 412 provided that the blade 414 trails the FSW tool 280 and spans the plasticized region. For example, in some embodiments, the blade 414 may extend along the entire inner edge 4122 of the bottom 412. In these embodiments, the FSW tool can weld a seam in any direction without rearranging or reorienting the flash removal unit 410. Additionally or alternatively, in other embodiments, the bottom 412 of the cutting unit may be entirely flat (i.e., not include any zone), may include more than two zones, or may be contoured in any way.

Figure 5A:
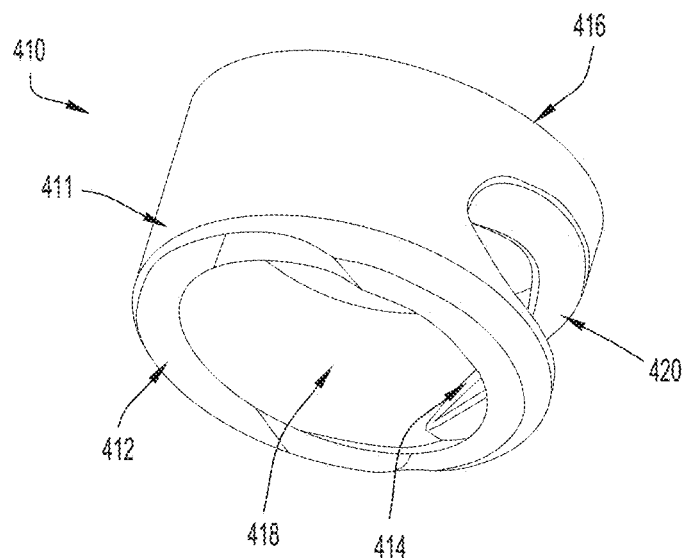
FIGS. 5A-5E provide a perspective view, a side view, a bottom view, a front sectional view, and a back view, respectively, of a cutting unit included in the flash removal unit of FIG. 3A.
Figure 5B:
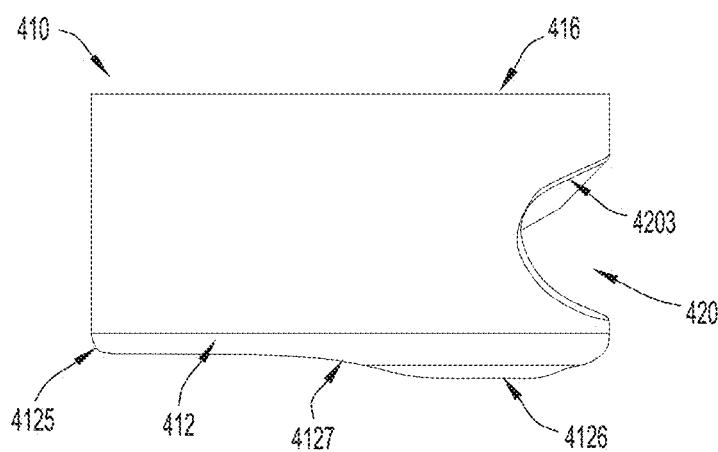
Figure 5D:
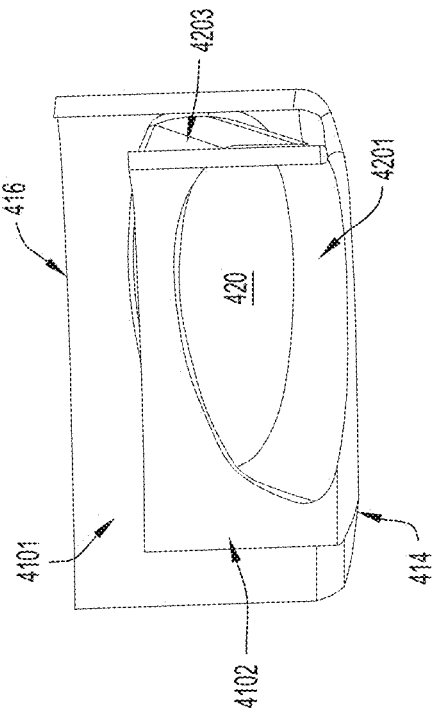
Figure 5E:
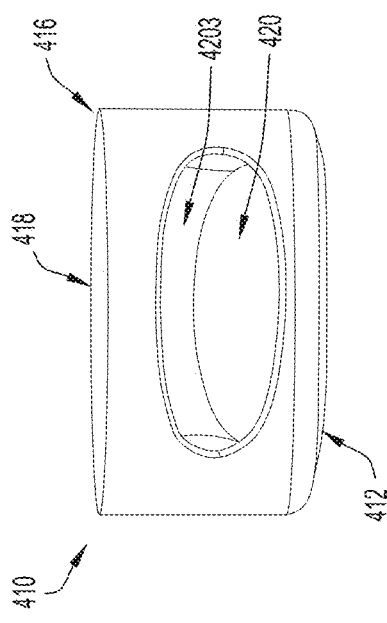
Figure 5C:
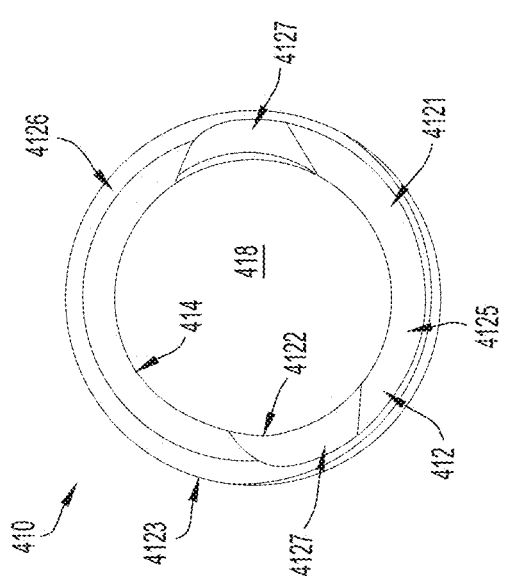

Still referring to FIGS. 4 and 5A-5E, in the depicted embodiment, the cutting unit is substantially hollow and includes an outer wall 4101 and an inner wall 4102 (see FIG. 5D, which shows, among other items, a wall 4203 extending through a hollow area formed between inner wall 4102 and outer wall 4101). As mentioned, the bottom 412 is closed or solid. Meanwhile, the top 416 may be open or closed and, overall, the cutting unit 410 can be hollow, solid, filled, partially solid, etc. However, regardless of the overall structure of the cutting unit 410, the main body 411 also defines at least one circumferential opening 420, insofar as the word "circumferential" is used to describe how at least one opening is disposed on/around a circumference of the cutting unit 410. In the embodiment depicted in FIGS. 5A-5E, the cutting unit 420 includes a single opening 420; however, in other embodiments, such as the embodiment depicted in FIGS. 6A and 6B, the main body 411 may define a plurality of openings.

The opening 420 defines a pathway that extends from the inner wall 4101 to the outer wall 4102 so that any flash detached from a welding seam by blade 414 can exit the central opening 418 of the cutting unit 410. Put another way, the opening 410 provides a channel through which detached flash can exit the cutting unit 410. As is discussed in further detail below, in the depicted embodiment, suction generated by a vacuum unit 42 (see FIGS. 1A and 1B) that is operatively coupled to the flash removal unit 400 draws detached flash out of the cutting unit 410 and into the brushing unit 430. However, in other embodiments, the detached flash need not move be drawn into a brushing unit by suction and, instead, can simply exit the cutting unit 410 via the opening 420.

In order to encourage detached chips of flash to exit the cutting unit through the opening 420, the opening 420 includes an upwardly sloped bottom wall 4201 and an upwardly sloped top wall 4203. Put another way, on the inner wall 4102 the opening 420 is disposed at a first height below a fixed horizontal plane (e.g., a horizontal plane aligned with the top edge 416 of the outer wall 4101) and, on the outer wall 4101, the opening 420 is disposed a second distance below the fixed horizontal plane. The second distance is less than the first distance and walls 4201 and 4203 connect these longitudinally offset openings. The upwardly sloped walls 4201 and 4203 help to guide detached flash up and away from a welding seam and, thus, help the flash removal unit 400 capture flash removed by the cutting unit 410.

Figure 6B:
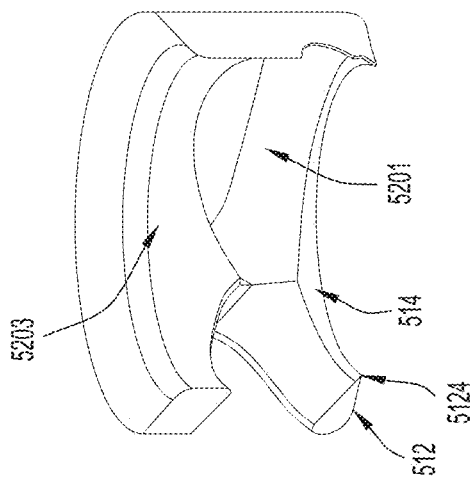
FIGS. 6A and 6B provide a top perspective view and a sectional view, respectively, of another example embodiment of a cutting unit suitable for the flash removal unit of FIG. 3A.
Figure 6A:
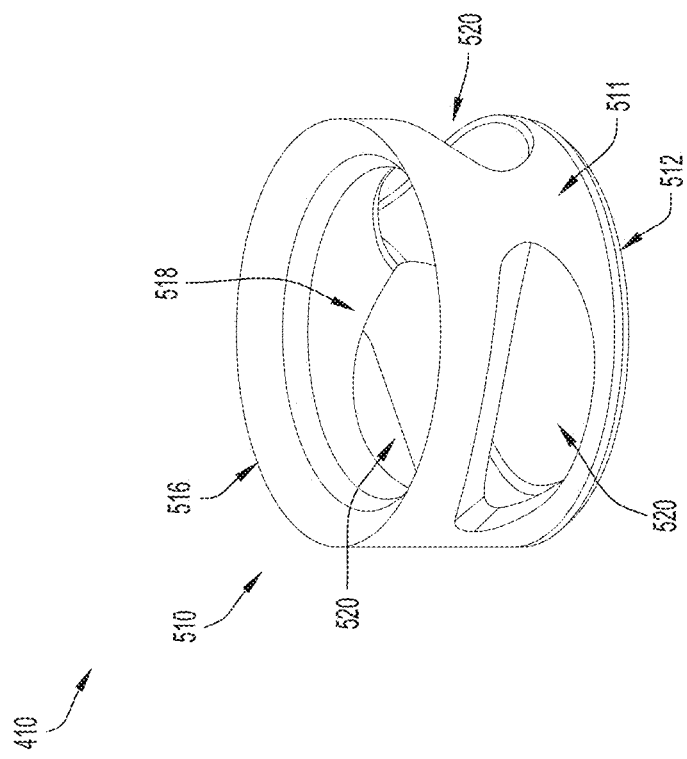

Now turning to FIGS. 6A and 6B, these Figures depict a cutting unit 510 configured in accordance with a second embodiment. The cutting unit 510 is largely similar to the cutting unit 410 depicted in FIGS. 5A-5E, except that the cutting unit 510 includes multiple circumferential openings 520 spaced around a solid main body 511 and also includes a substantially flat bottom 512 with an annular blade 514 that extends around an entirety of the inner edge 5124 of the bottom 512. For brevity, parts of cutting unit 510 that are similar to parts of cutting unit 410, including top 516, central opening 518, upwardly sloping top and bottom walls 5201 and 5203 of the opening 520, and the overall shape and size of the cutting unit 510, are not described in detail and any description of parts of cutting unit 410 included above is to be understood to apply to the like parts included in cutting unit 510.

The multiple openings 520 and the annular blade 514 included in cutting unit 510 allow a flash removal unit 400 including the cutting unit 510 to be used continuously for FSW operations in any direction without rearranging reorienting the flash removal unit 400. For example, if desired, a flash removal unit 400 including the cutting unit 510 could make multiple passes back and forth along a seam without rotating the entire FSW machine 180 degrees at an end of the seam. By comparison, a flash removal unit 400 including cutting unit 410 and/or a FSW machine with a flash removal unit 400 including the cutting unit 410 might need to be reoriented to keep the opening 420 and blade 414 oriented at a trailing edge of the FSW operations before changing the direction of FSW operations executed with that machine.

That being said, the cutting unit 410 may offer at least some advantages as compared to cutting unit 510. For example, it may be cheaper to produce a cutting unit with fewer circumferential openings and fewer circumferential openings may allow the flash removal unit 400 to utilize less (or less complicated) suction since the suction (e.g., provided by vacuum unit 42) can draw removed flash along less paths (which are defined by the openings). Consequently, the number of openings included in a cutting unit may be determined by balancing advantages against needs for a particular flash removal unit 400. The size and position of the blade may also be determined based on similar considerations and/or based on the number of openings.

Figure 7B:
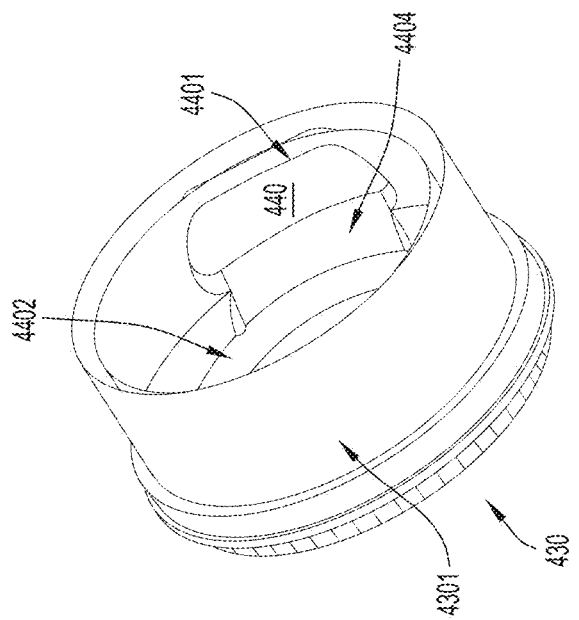
FIGS. 7A and 7B provide a bottom perspective view and a top perspective view, respectively, of a brush unit included in the flash removal unit of FIG. 3A.
Figure 7A:
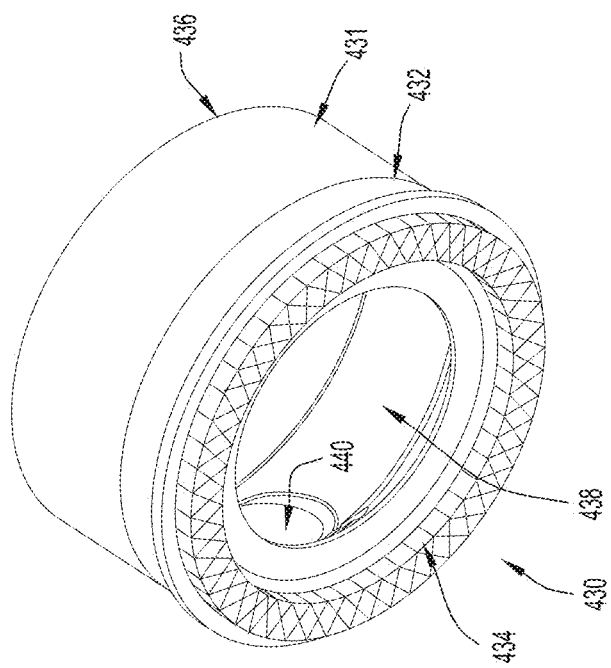

Now turning to FIGS. 7A and 7B, but with continued reference to FIG. 4, for a description of an example brushing unit 430 that may be included in the flash removal unit 400. In the depicted embodiment, the brushing unit 430 includes an annular main body 431 that extends from a bottom 432 to a top 436 while defining a central opening 438 that defines the flash capture area FA. The bottom 432 supports a brush 434 that is configured to retain chips of detached flash within the flash capture area FA of the flash removal unit 400. That is, the brush 434 prevents, or at least discourages, detached flash from sliding outside the periphery of the flash removal unit 400. The brush 434 also includes or defines airflow channels so that air can enter the brushing unit 430 and/or flash capture area FA when suction is applied to the flash removal unit (e.g., provided by vacuum unit 42). In at least some embodiments, the channels may also allow chips of detached flash to be suctioned into the main body 431 of the brushing unit 430 through the brush 434.

The main body 431 also defines a circumferential opening 440 that is configured to align with the opening 420 included in cutting unit 410 so that the opening 440 can guide detached flash exiting the cutting unit 410 away from the flash removal unit 400 (insofar as the term "circumferential" is used similar to the manner it is used above, except now with respect to the brushing unit 430 instead of the cutting unit 410). The opening 420 extends through an outer wall 4401 of the main body 431 and, in the depicted embodiment, is disposed above an inner wall 4402 of the main body 431 so that the opening need not extend through the inner wall 4402. However, in other embodiments, the opening 420 can extend through any portions of the main body 431, provided that it provides a path or channel from the central opening 438 to an exterior of the main body 431.

In the depicted embodiment, the brushing unit 430 includes only a single opening 440; however, in other embodiments, the brushing unit 430 may include any number of openings (similar to the cutting unit 410). As is discussed in further detail below, the opening 440 is positioned to align with the opening 420 included in the cutting unit 410 so that the opening 440 and opening 420 can define a pathway for detached flash to exit the flash removal unit 400. Consequently, if the cutting unit includes a plurality of openings (e.g., as shown in FIGS. 6A and 6B), the brushing unit 430 may also include a plurality of openings, which may be positioned to match or mate with the openings included on the cutting unit 410.

Alternatively, the brushing unit 430 need not include a pattern of openings 440 that matches the openings included on a cutting unit and, instead, may define radially oriented flow paths that operatively connect multiple (e.g., all) openings of the cutting unit to any number (e.g., one) of openings 440 included on the brushing unit 440. In the depicted embodiment, the brushing unit 440 includes an upwardly sloped surface 4404 (similar to the upwardly sloped surfaces 4201 and 4203 included in the cutting unit 410) that connects opening 440 to the central opening 438 of the brushing unit 430. The sloped surface 4404 also encourages detached flash to move up and away from a welding seam when suction is applied to the flash removal unit 400 (e.g., by vacuum unit 42).

Figure 8:
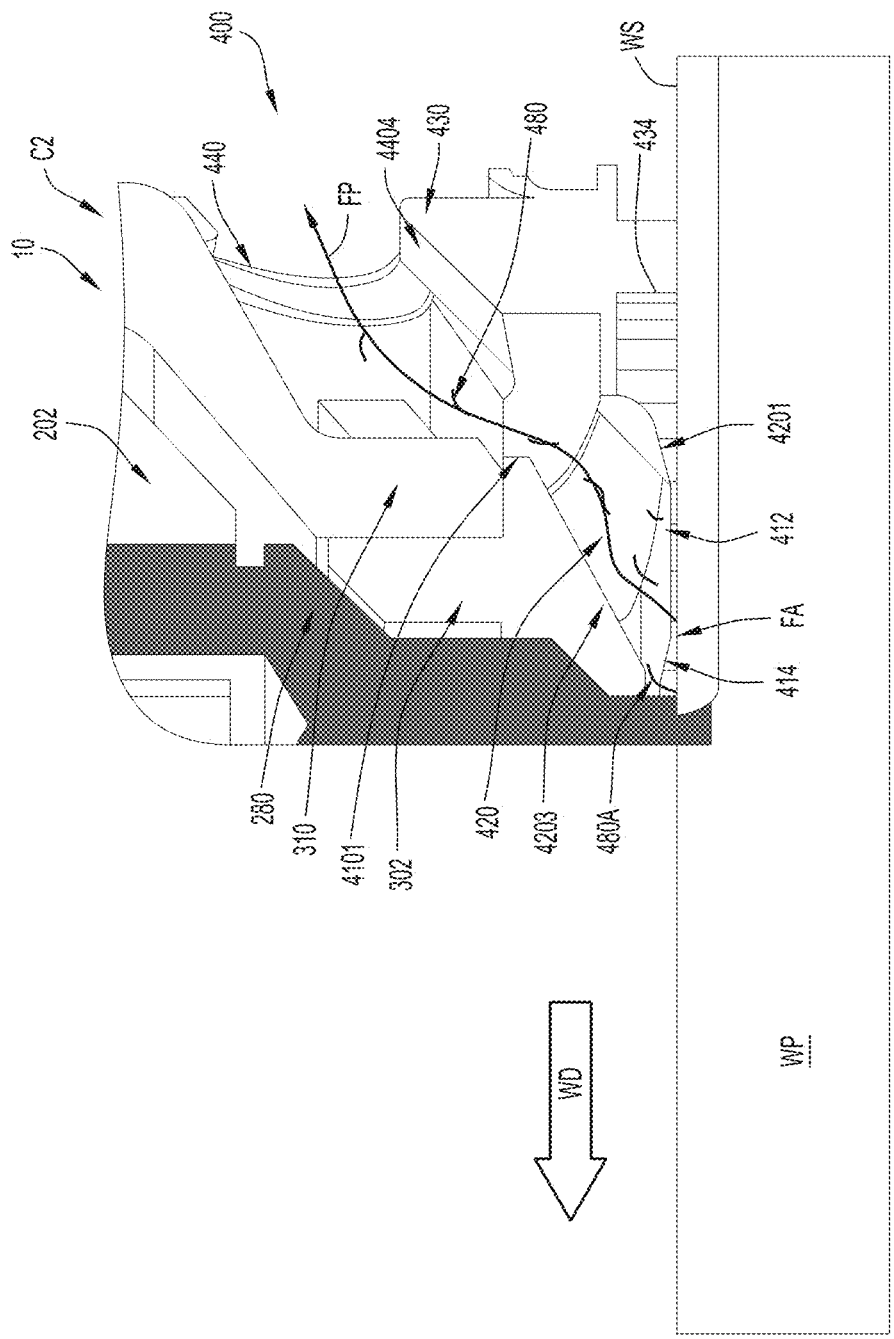
FIG. 8 is a sectional view of a portion of the flash removal unit of FIG. 3A while installed on the FSW head of FIG. 1B during FSW operations.

FIG. 8 depicts an example embodiment of the flash removal unit 400 during FSW operations. In this example, the flash removal unit 400 is included on the FSW head 10 while the FSW head 10 is in its stationary shoulder configuration C2. In this configuration, the FSW head 10 is acting on a workpiece "WP" to generate a weld seam "WS" while moving in a weld direction "WD." As mentioned, in the depicted embodiment, the opening 420 in the cutting unit 410 is aligned with the opening 440 included in the brushing unit 430 at a trailing edge of the welding head 10 (e.g., a back of the welding head 10 with respect to the welding direction "WD"). Thus, opening 420 and opening 440 collectively define a flow path "FP" that exits the flash removal unit 400 at a trailing edge of the welding head 10.

More specifically, the upwardly sloped walls 4201 and 4203 of opening 420 (together with sidewalls extending therebetween) extends from a first segment of the flash capture area FA that trails the FSW tool 280 to the central opening 438 of the brushing unit, adjacent the upwardly sloped wall 4404 of the brushing unit 440. The suction provided by the vacuum unit, draws the detached flash up this first segment and then, further draw the detached flash up a second segment defined by the upwardly sloped wall 4404 and the opening 440 of the brushing unit 440.

Although not shown, in at least some embodiments, tubing can connect the vacuum unit 42 (see FIG. 1) to the exterior of opening 440. This tubing can create suction along the flow path FP and also ensure that detached chips of flash that exiting the flash removal unit 400 are neatly captured or gathered. Moreover, in at least some embodiments, the vacuum unit 42 not only creates a suctioning force to drawn flash 480 along flow path FP, but also captures the flash 480 into a canister or receptacle of some type (not shown). In these embodiments, the brush unit 430, cutting unit 410 and the vacuum 42 cooperate to remove nearly all of the flash 480 created during FSW operations without creating any mess in the workshop, on the workpiece, or on/in the machine.

Still referring to FIG. 8, as can be seen, the bottom 412 of the cutting unit 410, or at least the blade 414 included on the bottom 412 of the cutting unit 410, is longitudinally spaced (e.g., vertically spaced) from a bottom of the tool 280 so that the bottom 412 (or at least the blade 414) moves against the workpiece WP when the tool 280 penetrates the workpiece WP to create the weld seam WS. Thus, when the tool 280 welds a weld seam WS, the blade 414 essentially shaves the top of the weld seam WS to detach or remove any flash 480 from the top of the weld seam WS. In FIG. 8, flash 480A represents flash that has not yet been removed from the weld seam WS because it has not yet reached the blade 414. The remaining flash 480 shown in FIG. 8 has been cut away from the weld seam WS by the blade 414 and, thus, is being suctioned along the flow path FP.

The brush 434 is also longitudinally spaced to align with the top of the weld seam WS and, thus, can work to prevent flash 480 from escaping the flash capture area FA. That is, since the brush 434 also rides along the top of the weld seam WS, the brush 434 can retain the flash 480 in an area on which suction is acting. In at least some embodiments, the brush 434 may be resilient and at least slightly compressible to ensure that the brush 434 remains flush against the top of the weld seam WS during FSW operations. Additionally or alternatively, the brushing unit 320 and/or the cutting unit 410 may be secured to the welding head via an adjustable connection that allows a user to move the brushing unit 320 and/or the cutting unit 410 into direct contact with a top of the weld seam WS prior to commencing FSW operations. Still further, the brushing unit 320 and/or the cutting unit 410 might be coupled to the FSW head via a resilient connection that biases the brushing unit 320 and/or the cutting unit 410 towards the top of the weld seam WS in order to ensure that these units can cut and collect flash generated during FSW operations.

To summarize, in one form, a flash removal unit suitable for a FSW head is provided, comprising: a blade that removes flash created by a FSW tool during FSW operations; and an annular body that defines a flash capture area around the blade, the annular body being configured to at least temporarily retain the flash removed by the blade within the flash capture area.

In another form, a cutting unit suitable for a FSW head is provided, comprising: an annular body with a top and a bottom, the bottom including an inner edge and an outer edge; and a partially annular blade that extends around at least a portion of the inner edge of the bottom of the annular body, wherein the annular body is fixed to the FSW head so that the partially annular blade is stationary with respect to the FSW head during FSW operations of the FSW head and so that the blade is positioned to trail a FSW tool included in the FSW head and cut flash created by the FSW tool during FSW operations off of a weld seam.

In yet another form, an FSW head is provided comprising: a head housing that extends from a top end to a bottom end; an axle that is coaxial with and rotatable within the head housing, the axle including an end portion that extends beyond the head housing and supports an FSW tool; and an annular flash removal unit that removes flash created by the FSW tool during FSW operations of the FSW head, wherein the annular flash removal unit defines a flash capture area around the FSW tool and at least temporarily retains removed flash within the flash capture area.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

We claim:

1. A flash removal unit suitable for a friction stir welding (FSW) head, comprising:
    a blade that removes flash created by a FSW tool during FSW operations; and
    an annular body that defines a flash capture area around the blade, the annular body being configured to at least temporarily retain the flash removed by the blade within the flash capture area, wherein the annular body is an annular brushing unit and is disposed radially exterior of the blade.

2. The flash removal unit of claim 1, wherein the flash removal unit further comprises:
    an annular cutting unit that includes the blade.

3. The flash removal unit of claim 2, wherein the annular cutting unit comprises:
    an inner edge, wherein the blade extends along at least a portion of the inner edge so that the blade is at least partially annular.

4. The flash removal unit of claim 3, wherein the portion of the inner edge is aligned with a trailing edge of the FSW operations.

5. The flash removal unit of claim 3, wherein the blade is a stationary with respect to the FSW head and is positioned to shave a top of a plasticized region created during the FSW operations.

6. The flash removal unit of claim 1, wherein the annular body further comprises:
   a brush that is longitudinally aligned with the blade and configured to at least temporarily retain the flash removed by the blade within the flash capture area.

7. The flash removal unit of claim 1, further comprising:
   a flow path that extends through the annular body and guides the flash removed by the blade away from the flash capture area.

8. The flash removal unit of claim 7, wherein:
   the blade is included in a cutting unit that defines one or more first openings; and
   the annular body defines one or more second openings, wherein the one or more first openings and the one or more second openings define the flow path.

9. A cutting unit suitable for a friction stir welding (FSW) head, comprising:
   an annular body with one or more openings formed in the annular body, a top, and a bottom, the bottom including an inner edge and an outer edge; and
   a partially annular blade that extends around at least a portion of the inner edge of the bottom of the annular body, wherein the annular body is fixed to the FSW head so that the partially annular blade is stationary with respect to the FSW head during FSW operations of the FSW head and so that the blade is positioned to trail a FSW tool included in the FSW head and cut flash created by the FSW tool during FSW operations off of a weld seam,
   wherein the one or more openings formed in the annular body are configured to guide the flash cut off of the weld seam away from the weld seam.

10. The cutting unit of claim 9, wherein the partially annular blade extends around the entire inner edge.

11. A friction stir welding (FSW) head, comprising:
   a head housing that extends from a top end to a bottom end;
   an axle that is coaxial with and rotatable within the head housing, the axle including an end portion that extends beyond the head housing;
   an FSW tool disposed at the end portion; and
   an annular flash removal unit that removes flash created by the FSW tool during FSW operations of the FSW head, wherein the annular flash removal unit defines a flash capture area around the FSW tool and at least temporarily retains removed flash within the flash capture area.

12. The FSW head of claim 11, wherein the annular flash removal unit comprises:
   an annular cutting unit that includes a blade; and
   an annular brushing unit that is disposed radially exterior of the annular cutting unit and defines the flash capture area.

13. The FSW head of claim 12, wherein the annular cutting unit comprises:
   an inner edge and the blade extends along at least a portion of the inner edge.

14. The FSW head of claim 12, wherein the blade is longitudinally spaced from a bottom of FSW tool so that the blade shaves a top a weld seam created when the FSW tool penetrates a workpiece or a joint to cause the FSW operations.

15. The FSW head of claim 14, wherein the annular flash removal unit further comprises:
   a brush that is longitudinally aligned with the blade and configured to at least temporarily retain the removed flash within the flash capture area.

16. The FSW head of claim 11, wherein the annular flash removal unit defines a flow path configured to guide the removed flash from the flash capture area to an exterior of the flash removal unit.

17. The FSW head of claim 16, wherein the annular flash removal unit comprises:
   a cutting unit with one or more first openings; and
   a brushing unit with one or more second openings, wherein the one or more first openings and the one or more second openings define the flow path.

18. The FSW head of claim 11, wherein the FSW head comprises a stationary shoulder FSW head.

19. The FSW head of claim 11, wherein the FSW head comprises a rotating shoulder FSW head.

* * * * *